US007007856B2

(12) United States Patent
La Falce et al.

(10) Patent No.: US 7,007,856 B2
(45) Date of Patent: Mar. 7, 2006

(54) EXTENDED ENGINE OFF PASSENGER CLIMATE CONTROL SYSTEM AND METHOD

(75) Inventors: Guy E. La Falce, Sterling Heights, MI (US); James R. Yurgil, Livonia, MI (US); Joel J. Anderson, Davison, MI (US)

(73) Assignee: General Motors Corporation, Detroit, MI (US)

( * ) Notice: Subject to any disclaimer, the term of this patent is extended or adjusted under 35 U.S.C. 154(b) by 315 days.

(21) Appl. No.: 10/378,786

(22) Filed: Mar. 4, 2003

(65) Prior Publication Data

US 2004/0182097 A1 Sep. 23, 2004

(51) Int. Cl.
*B60H 1/02* (2006.01)
(52) U.S. Cl. ...................... 237/12.3 B; 165/41; 165/42
(58) Field of Classification Search ........... 237/12.3 B, 237/12.3 R, 2 A, 2 B; 236/238.1, 238.2, 236/238.6
See application file for complete search history.

(56) References Cited

U.S. PATENT DOCUMENTS 3,620,297 A * 11/1971 Adkins ........................ 62/141
3,966,119 A * 6/1976 Harter et al. .......... 237/12.3 B
4,321,801 A * 3/1982 Collard, Jr. ................ 62/238.4
4,342,200 A * 8/1982 Lowi, Jr. ..................... 62/191
4,627,483 A * 12/1986 Harshbarger et al. ....... 237/2 A
4,982,895 A * 1/1991 Shimizu et al. ............. 237/2 A
5,123,594 A * 6/1992 Humburg .................... 237/2 A
5,186,013 A * 2/1993 Durso ......................... 62/115
5,293,928 A * 3/1994 Iida et al. ................... 165/204
5,367,601 A * 11/1994 Hannabery .................. 392/307
5,465,588 A * 11/1995 McCahill et al. ............. 62/127
5,878,589 A * 3/1999 Tanaka et al. ................ 62/199
5,954,266 A * 9/1999 Hoshino et al. ....... 237/12.3 R
6,042,016 A * 3/2000 Ikeda .................... 237/12.3 C
6,047,770 A * 4/2000 Suzuki et al. ............... 165/202
6,138,466 A * 10/2000 Lake et al. ................... 62/199
6,152,217 A * 11/2000 Ito et al. ..................... 165/202
6,164,367 A * 12/2000 Kurahashi et al. ............ 165/42
6,371,202 B1 * 4/2002 Takano et al. .............. 165/202
6,516,623 B1 * 2/2003 Collier ...................... 62/238.7
6,679,320 B1 * 1/2004 Stefan ........................ 165/202
6,715,540 B1 * 4/2004 Kobayashi et al. ......... 165/202
6,810,952 B1 * 11/2004 Ben Fredj et al. .......... 165/202

* cited by examiner

*Primary Examiner*—Derek S. Boles
(74) *Attorney, Agent, or Firm*—Christopher DeVries

(57) ABSTRACT

An extended engine off passenger climate control system utilizes an advanced temperature control module in combination with modifications to the conventional heating/ventilation/air conditioning (HVAC) system to provide occupants in the passenger cabin of a hybrid electric motor vehicle with adequate heat or air conditioning for up to two minutes after the gasoline engine is turned off. A two stage orifice between the condenser and the evaporator of the air conditioning system slows the equilibration of the pressures on the high pressure side and low pressure side of the air conditioning system when the air conditioner compressor is turned off, allowing the passenger cabin to continue receiving cooling air even when the gasoline engine, and thus the compressor, is off. An auxiliary engine coolant pump circulates heated engine coolant through the heater core when the gasoline engine is turned off, thus providing heat when conditions require passenger cabin heating.

18 Claims, 2 Drawing Sheets

EXTENDED ENGINE OFF PASSENGER CLIMATE CONTROL SYSTEM AND METHOD

TECHNICAL FIELD

This invention relates generally to a motor vehicle climate control system and method, and more specifically to a motor vehicle climate control system and method for use in a hybrid electric vehicle.

BACKGROUND OF THE INVENTION

Hybrid electric vehicles achieve high fuel efficiency and low emissions by combining small, highly efficient internal combustion gasoline engines with electric motors. Although the mechanical means by which the electric motor and gasoline engine are coupled varies between vehicle manufacturers, almost all hybrid electric vehicles utilize both the gasoline engine and the electric motor to power the driving wheels. The engine control system on the vehicle varies the amount of power from the electric motor and the gasoline engine depending on necessary power output and driving conditions, selecting the most efficient method of powering the car for the situation at hand.

In general, fuel efficiency in hybrid electric vehicles is enhanced by minimizing use of the gasoline engine at inefficient periods such as when the vehicle is temporarily stopped. Such vehicles increase fuel efficiency by shutting off the gasoline engine at extended stops, such as at stop signs or stop lights (this is known as an 'extended engine off' situation). When the gasoline engine is off, auxiliary systems such as the radio, gauges, power windows, and the like are kept operative by a low voltage (usually 12 volt) electrical system. When the stop light changes or when it is otherwise safe to proceed, the accelerator pedal is depressed, the gasoline engine starts up immediately, and the vehicle can drive off. Such extended engine off operation is beneficial in reducing fuel use, but makes operation of a conventional climate control system difficult. The passenger cabin heating and air conditioning systems do not work without some kind of power input. The compressor that powers the air conditioning system runs off of the crankshaft of the gasoline engine, and therefore is inoperative when the gasoline engine is shut off at stoplights or stop signs. Without the compressor running, pressure differentials within the air conditioning system, that are necessary for the air conditioner to function, quickly decrease, eliminating the cooling ability of the air conditioner. Without the cooling ability of the air conditioning system, the air circulating through the passenger cabin increases in temperature, may become uncomfortably warm, and, after a few seconds, begins to have a musty smell. The passenger cabin heating system also does not work without the gasoline engine running. The heater core is heated by engine coolant that circulates through and flows from the gasoline engine. When the gasoline engine is turned off, the coolant no longer circulates, and the heater core is no longer able to warm the air that flows to and warms the passenger cabin.

Conventional hybrid electric vehicles deal with this extended engine off climate control problem in a number ways. One method is to simply take no action. When the vehicle arrives at a stop sign or stoplight, the gasoline engine turns off, and the vehicle provides the occupants of the passenger cabin with no additional heating or cooling until the accelerator pedal is depressed and the gasoline engine starts again. This approach is economical, but may lead to uncomfortable conditions for the vehicle passengers. Another approach to the extended engine off climate control problem is keep the gasoline engine running at stoplights or stop signs. Keeping the engine running allows the climate control system to continue providing the passenger cabin with heating or cooling, but contributes nothing to fuel efficiency as the gasoline engine is still operating and consuming fuel. A third approach to dealing with this problem is employed by some "mild" gasoline-electric hybrid engines having a combined electric starter-alternator motor that supports the hybrid functionality. This unit is typically belted to the crankshaft pulley of the gasoline engine to perform the automatic engine shutoff, automatic restart, and charging functions. If the crankshaft pulley is actually clutched to the crankshaft, the associated belt driven components (e.g., air conditioning compressor and engine coolant pump) can be driven by this electric motor when the gasoline engine is in a temporary shutoff state. This allows the passenger compartment to continue receiving cooling or heating air flow. The maximum fuel efficiency of the hybrid vehicle is reduced, however, because the battery energy that powers the electric motor must be replenished, at some time, by the gasoline engine.

Currently, the only ways to maintaining passenger comfort during an extended engine off period in a hybrid electric vehicle are either by keeping the gasoline engine running or by running the electric motor, and both sacrifice fuel efficiency for passenger comfort. It is desirable to maintain both fuel efficiency and passenger comfort. Accordingly, a need exists for an extended engine off passenger climate control system and method.

SUMMARY OF THE INVENTION

An extended engine off climate control system for a hybrid electric motor vehicle is provided in accordance with the present invention. The engine off climate control system for a hybrid electric motor vehicle comprising a gasoline engine in a gasoline engine bay and an electric motor, the system comprising an air conditioning compressor and an air conditioning condenser coupled to receive refrigerant vapor from the air conditioning compressor. In addition, the system comprising a two stage expansion orifice coupled to receive refrigerant liquid from the air conditioning condenser, the two stage expansion orifice comprising a first orifice size and a second orifice size different than the first orifice size, and an air conditioning evaporator coupled to receive refrigerant liquid from the two stage expansion orifice.

A method for maintaining passenger climate control in a passenger cabin of a hybrid electric motor vehicle having a gasoline engine and an electric motor is provided in accordance with the present invention. The method comprising the steps of sensing a plurality of climate conditions, sensing vehicle speed, and controlling the orifice size of an expansion orifice positioned between an air conditioning condenser and an air conditioning evaporator in response to sensing the plurality of climate condition and the vehicle speed.

BRIEF DESCRIPTION OF THE DRAWINGS

The present invention will hereinafter be described in conjunction with the following drawing figures, wherein like numerals denote like elements, and The inventive device and the method for its use will be understood after review of the following description considered together with the drawings in which.

DESCRIPTION OF THE PREFERRED EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the drawings.

An extended engine off passenger climate control system, in accordance with an embodiment of the invention, utilizes an advanced temperature control module in combination with modifications to the conventional heating/ventilation/air conditioning (HVAC) system to provide occupants in the passenger cabin of a hybrid electric motor vehicle with adequate heat or air conditioning for up to two minutes after the gasoline engine is turned off. As used herein, the term "air conditioning" will be used to refer to the system for cooling air in the passenger cabin. In accordance with one embodiment of the invention, the air conditioning portion of the inventive climate control system includes a two stage orifice between the condenser and the evaporator of the air conditioning system that slows the equilibration of the pressures on the high pressure side and low pressure side of the air conditioning system when the air conditioner compressor is turned off. Slowing the rate at which the pressures equilibrate allows the passenger cabin to continue receiving cooling air even when the gasoline engine, and thus the compressor, is off. In accordance with another embodiment of the invention, the heating portion of the inventive climate control system includes an auxiliary engine coolant pump that circulates heated engine coolant through the heater core when the gasoline engine is turned off, thus maintaining the heating ability of the climate control system when conditions require heating of the passenger cabin. Further embodiments and variations are explained and illustrated below.

Figure 1:
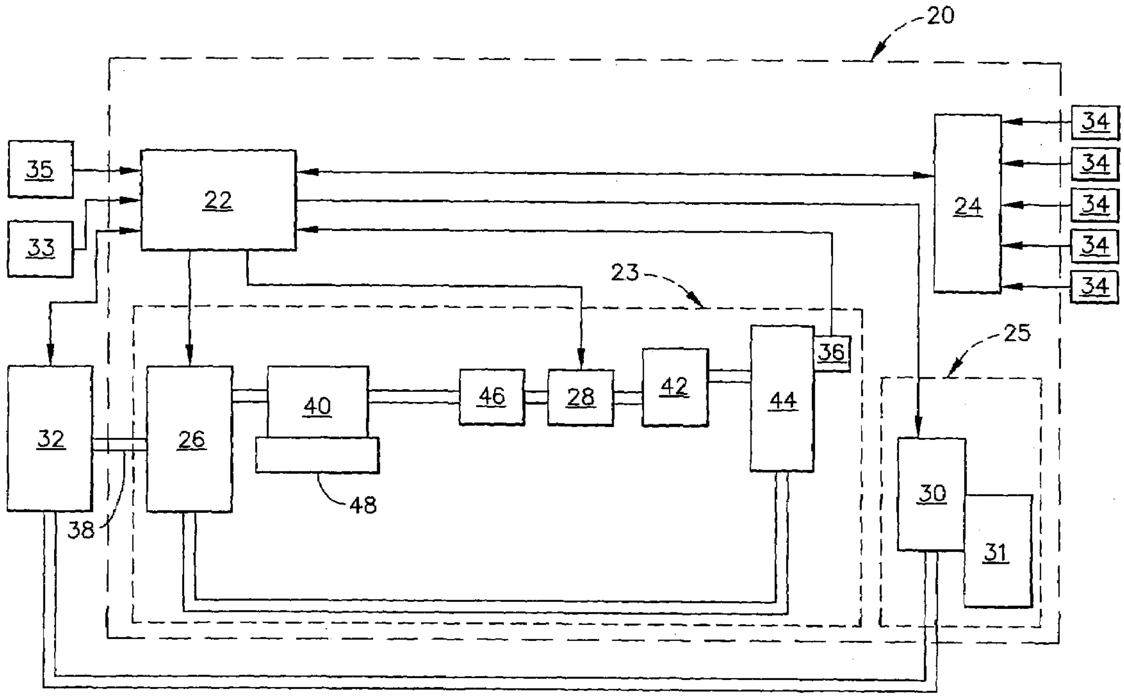
FIG. 1 schematically illustrates an extended engine off passenger climate control system in accordance with one embodiment of the invention.

FIG. 1 schematically illustrates various aspects of an extended engine off passenger climate control system 20. In accordance with one embodiment of the invention, the climate control system includes a powertrain control module 22 that is coupled to and communicates with a temperature control module 24, an air conditioning (A/C) system 23, accelerator pedal sensor 35, and gasoline engine 32 including a vehicle speed sensor 33 which may or may not be coupled directly to the gasoline engine. In accordance with a further embodiment of the invention, system 20 can also include a heater system 25. The air conditioning system is configured to supply cooled air to the passenger cabin and the heater system is configured to supply warmed air to the passenger cabin. Powertrain control module 22 may be, for example, a portion of the central control unit of the motor vehicle, a standalone processor unit, or the like. The powertrain control module is configured to communicate with the various elements of the climate control system through communication signals that can be sent or received over a local area network, by using radio frequency signals, or the like. Temperature control module 24, which can be, for example, a portion of the central control unit, a standalone microprocessor, or the like, receives information from a plurality of sensors 34 and relays that information to powertrain control module 22. In response to information received from the temperature control module, the gasoline engine, and the A/C system, the powertrain control module controls the A/C system and the heater system, both during normal operation and during an extended engine off period. Temperature control module 24 can be either a manual or an automatic temperature control unit. Sensors 34 may provide temperature control module 24 with information regarding any or all of the following climate control conditions: blower motor speed (the speed of the fan circulating air in the passenger cabin), desired passenger cabin temperature, actual passenger cabin temperature, duct temperature (the temperature in the duct leading to the passenger cabin), air mix door position (determining the ratio of cooled air mixed with ambient air), outside air temperature, solar load, and the like. Air conditioning system 23 includes, in accordance with one embodiment of the invention, a compressor 26, condenser 40, two stage expansion orifice 28, evaporator 42, accumulator 44, and pressure cycling switch 36. The compressor, condenser, evaporator, accumulator, and pressure cycling switch are all of a conventional design and operate in a known manner, and so will not be described in detail. Heater system 25 includes, in accordance with a further embodiment of the invention, a heater core 31 and auxiliary low voltage (for example, 12 volt) engine coolant pump 30. The heater core is also of a conventional design and also will not be described in detail. Accelerator pedal sensor 35 senses the position of the accelerator pedal and relays that information to the powertrain control module. Based on this information, the powertrain control module may, for example, command the gasoline engine to begin fueling and start, adjust the amount of torque being produced by the gasoline engine, and the like.

Compressor 26 is powered by a crankshaft 38, which in turn is driven by gasoline engine 32. When the gasoline engine is running and the air conditioner is turned on, low pressure refrigerant vapor flows to the compressor where it is compressed to a high pressure refrigerant vapor. The compressor is cycled on and off, as needed, and in response to signals conveyed from pressure cycling switch 36 to powertrain control module 22 to maintain the refrigerant vapor at the appropriate pressure. The high pressure refrigerant vapor flows to condenser 40 where it is condensed to a high pressure refrigerant liquid. In accordance with an embodiment of the invention, the high pressure refrigerant liquid flows from the condenser through a two stage expansion orifice 28. The expansion orifice provides a restriction to the high pressure refrigerant liquid in the line running from the condenser to evaporator 42. The orifice meters the flow of refrigerant liquid to the evaporator as a low pressure refrigerant liquid. The function of the two stage expansion orifice, in accordance with the invention will be explained in more detail below. The low pressure refrigerant liquid enters evaporator 42 and flows through tubing in the evaporator where it undergoes a phase change to a low pressure refrigerant vapor, absorbing heat from air flowing over the evaporator as the refrigerant changes phase. Air passing over the evaporator is cooled and dehumidified before the air is circulated to the passenger cabin of the vehicle. The low pressure refrigerant vapor, and any remaining refrigerant liquid that did not vaporize, passes from the evaporator to an accumulator where the vapor and liquid are separated. The low pressure refrigerant vapor is then recirculated to the compressor where the refrigeration cycle continues.

The expansion orifice controls the rate at which refrigerant liquid flows from the condenser to the evaporator. When the gasoline engine is off and the compressor is not operating, liquid continues to flow from the condenser to the evaporator as long as there is a sufficient pressure differential in the system. As the refrigerant liquid flows, the pressure differential decreases. The expansion orifice controls the liquid flow rate and hence the rate at which pressures within the air conditioning system equilibrate. When equilibrium is approached, the air conditioning system is unable to provide cooled air to the passenger cabin. In accordance with an embodiment of the invention, the expansion orifice that is normally used between the condenser and the evaporator is replaced by a two stage expansion orifice. The two stage expansion orifice includes two differently sized orifices. During normal operation of the air conditioning system, when the gasoline engine is running and the air conditioning compressor is operating, the larger orifice is selected to maximize the cooling capacity of the air conditioning system. During an extended engine off period when the compressor is not operating, the smaller orifice is selected. Selecting the smaller orifice reduces the flow of refrigerant liquid from the condenser to the evaporator, which in turn reduces the rate at which the pressures in the system equilibrate, and extends the length of time during which the air conditioner can provide cooled air to the passenger cabin. Preferably, two stage orifice 28 is a solenoid activated valve that allows one of two different diameter orifices to be selected. The two stage expansion orifice may be configured with two differently sized orifices in parallel with one or the other being selected, or may be a single orifice the size of which may be varied between a small diameter orifice size and a large diameter orifice size. In accordance with an embodiment of the invention, the powertrain control module selects which orifice is to be operative based on signals received from gasoline engine 32 or vehicle speed sensor 33 (whether the engine is running or not or whether the vehicle is slowing to an apparent stop) and from temperature control module 24 in response to inputs from sensors 34. Under normal operating conditions, when the gasoline engine is on, the powertrain control module may cause the two stage orifice to be opened to the larger diameter (for example, 72/1000 of an inch or about 0.183 centimeters). This larger diameter orifice is of the size used in conventional climate control systems. When the vehicle enters or is about to enter an extended engine off period, the powertrain control module may cause the two stage orifice to close to the smaller diameter (for example, fifty thousandths of an inch or about 0.127 centimeters). By using the smaller orifice, the length of time during which effective cooling can be supplied to the passenger cabin can be extended up to about two minutes, a time exceeding the normal extended engine off period.

Under normal operation of the vehicle, when the gasoline engine is running, if heated air is needed in the passenger cabin, as would be indicated by inputs from sensors 34 to temperature control module 24, powertrain control module 22, after receiving such information from the temperature control module, would cause heated engine coolant flowing through the gasoline engine to also circulate through heater core 31. The heater core acts as a heat exchanger, using the heated engine coolant to warm air passing over the heater core. The warmed air is then directed to the passenger cabin, as needed. When the vehicle is in an extended engine off period, however, engine coolant, although heated, is not circulating through the gasoline engine. In accordance with an embodiment of the invention, during an extended engine off period, heated engine coolant is circulated through the heater core by auxiliary coolant pump 30 so that the flow of heated air to the passenger cabin can be maintained. Auxiliary coolant pump 30 can be a small electric pump that runs off the vehicle's 12 volt battery. As noted above, the low voltage vehicle systems are maintained operational even during extended engine off periods. The auxiliary coolant pump circulates heated engine coolant from gasoline engine 32 to heater core 31 in response to signals from powertrain control module 22.

Figure 2:
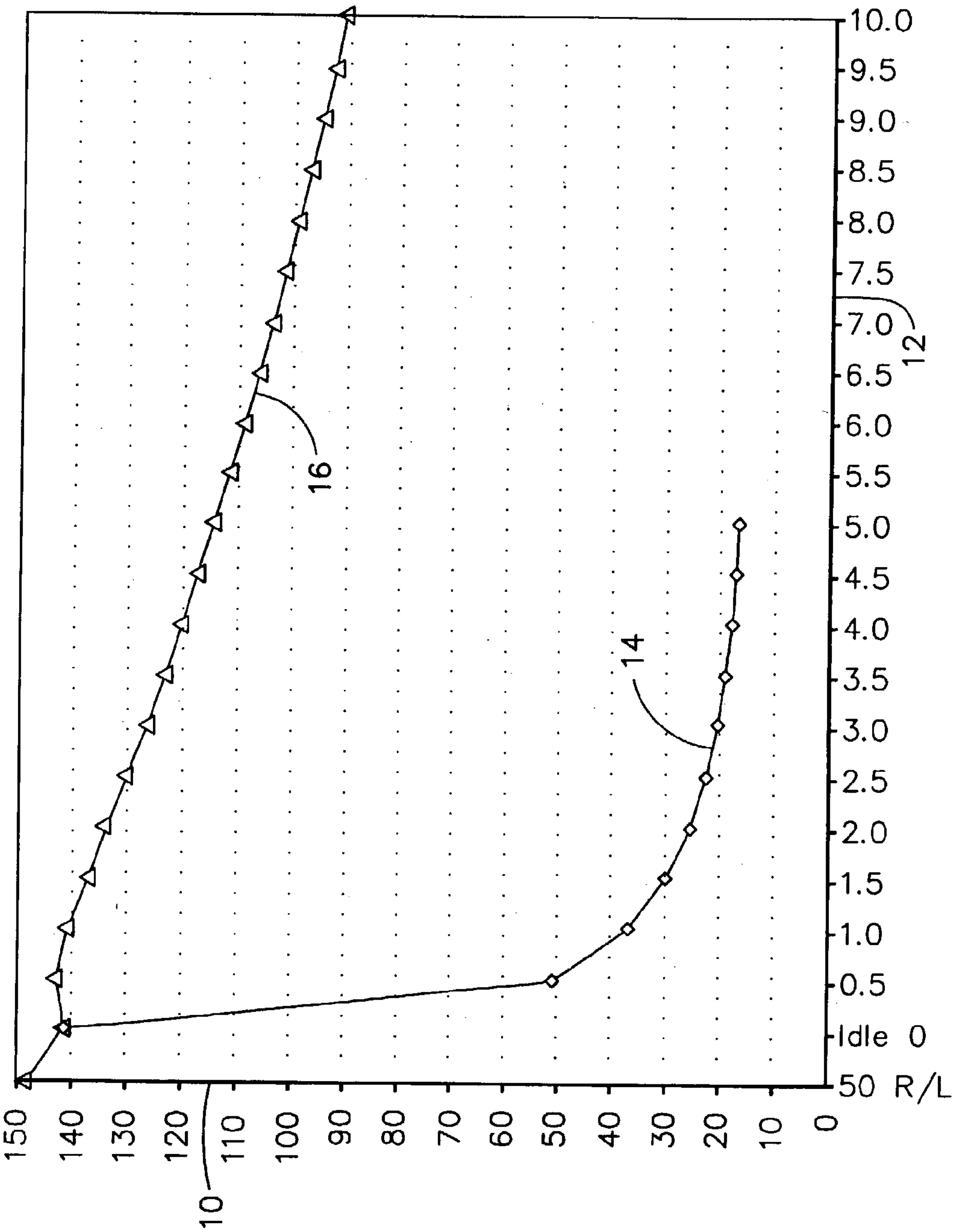
FIG. 2 illustrates in graphical form the change heater core temperature with the hybrid electric vehicle's gasoline engine off.

FIG. 2 illustrates in graphical form the effect an auxiliary coolant pump such as pump 30 has on heater core temperature with the gasoline engine of a hybrid electric vehicle off. This experimental data was obtained when the ambient temperature was zero degrees Fahrenheit. Heater core temperature in degrees Fahrenheit is plotted on vertical axis 10, and time in minutes after the gasoline engine is turned off is plotted on horizontal axis 12. Line 14 illustrates heater core temperature when there is no auxiliary engine coolant pump providing the heater core with heated engine coolant. After only a minute and a half the heater core temperature has dropped from 140° F. to below freezing. In contrast, line 16 illustrates heater core temperature when an auxiliary engine coolant pump functions to circulate the engine coolant through the core. In the first minute and a half after the gasoline engine is turned off, the temperature of the heater core with an auxiliary pump dropped less than 10° F. Thus, it is apparent that the use of an auxiliary coolant pump powered by the existing low voltage power supply allows the climate control system, in accordance with the invention, to continue supplying heated air to the passenger cabin during an extended engine off period.

With reference again to FIG. 1, in accordance with a further embodiment of the invention, air conditioning system 23 includes a small additional receiver 46 located on the high pressure side of the air conditioning system between condenser 40 and two stage orifice 28. The additional receiver that can have, for example, a volume of about ten cubic inches or about 160 cubic centimeters, increases the volume of high pressure liquid refrigerant that can be utilized by the air conditioning system. The increased volume of high pressure liquid refrigerant increases the head pressure on the high pressure side of the air conditioning system. In accordance with a further embodiment of the invention, the conventional accumulator of air conditioning system 23 is replaced by an accumulator having an increased volume, thereby increasing the volume of refrigerant that can be used in the air conditioning system. The additional receiver and the accumulator of increased volume, taken either alone or in combination, increase the volume of refrigerant usable in the air conditioning system. The increased volume of refrigerant increases the time during which pressures in the system are sufficiently out of equilibrium to allow the system to deliver cooled air to the passenger cabin.

In accordance with yet another embodiment of the invention, a reverse flow cooling fan 48 is placed proximate the radiator (not illustrated) and the air conditioning condenser. The reverse flow cooling fan draws hot air from the engine bay around the radiator during an extended engine off period and blows this hot air out past the air conditioning condenser. By drawing hot air around the condenser, the heat from the engine bay is used to heat the refrigerant in the condenser, thus increasing pressure on the high pressure side of the air conditioning system. Increasing the pressure on the high pressure side of the system increases the differential pressure between high pressure side and low pressure side. An increase in the differential pressure increases the time during which a sufficient pressure differential exists to provide cooling of the air flowing to the passenger cabin.

Methods for controlling passenger comfort in the passenger cabin of a hybrid electric motor vehicle, in accordance with various embodiments of the invention, can be understood by the following description considered together with continued reference to FIG. 1. When the gasoline engine of the hybrid motor vehicle is running, temperature control module 24 calculates, based on information from sensors 34, the amount of heating or cooling necessary in the passenger cabin. The temperature control module then sends signals relaying this information to the powertrain control module and adjusts the mix of conditioned and outside air to maintain the necessary passenger cabin temperature. The powertrain control module turns the A/C compressor on or off in response to the pressure cycling switch when A/C is requested from the temperature control module. Thus, when the gasoline engine is running, the extended engine off passenger climate control system operates in the same manner as a conventional climate control system.

In accordance with one embodiment of the invention, the extended engine off passenger climate control system differs from a conventional climate control system only when the gasoline engine is turned off during an extended engine off period. In this situation, depending on whether the temperature control module determines, based on inputs from sensors 34, that the climate control system should be in a heating mode or a cooling mode, the powertrain control module sends a signal to either auxiliary engine coolant pump 30 (if a heating mode has been selected) or to the air conditioning system (if the cooling mode has been selected).

In the case of a heating mode, in accordance with this embodiment of the invention, the auxiliary engine coolant pump begins circulating the heated engine coolant to the heater core. The heated engine coolant circulating through the heater core maintains the heater core at a sufficiently high temperature that the heater can provide the passenger cabin with adequate heating. The powertrain control module continues to control the auxiliary engine cooling pump until the powertrain control module senses, based on accelerator pedal sensor 35, that the accelerator pedal has been depressed, signaling the end of the extended engine off period. When the accelerator pedal is depressed, the powertrain control module sends one signal commanding the gasoline engine to begin fueling and start and another signal commanding the auxiliary engine coolant pump to stop pumping heated engine coolant. The powertrain control module then reverts back to a conventional manner of controlling passenger cabin temperature.

In the case of cooling mode, in accordance with this embodiment of the invention, when the gasoline engine shuts off and the hybrid electric motor vehicle enters an extended engine off period, powertrain control module 22 sends a signal to the solenoid controlling two stage orifice 28 causing the orifice to constrict to the small diameter setting to restrict the flow of refrigerant liquid from condenser 40 to evaporator 42. In accordance with a further embodiment of the invention, powertrain control module 22 also sends a signal to reverse flow cooling fan 48 causing the fan to start spinning and thereby causing a flow of heated air from the engine bay across condenser 40. The constricted two stage orifice reduces the rate at which the pressure differential between the high side and low side pressures of the air conditioning system decreases, extending the time the compressor-less air conditioning system can supply cooled air to the passenger cabin up to about two minutes, longer than most extended engine off periods. The use of reverse flow cooling fan 48 increases the pressure of the refrigerant liquid in condenser 40 and further increases the pressure gradient between the high pressure and low pressure sides of the air conditioning system. While the engine is stopped, temperature control module 24 continues monitoring signals from sensors 34 and sends signals to the powertrain control module concerning the capability of the A/C system to maintain the desired passenger cabin temperature. If the temperature control module signals the powertrain control module that the duct temperature has surpassed a predetermined temperature (for example, 55° F.), or the temperature control module signals the powertrain control module that more cooling is needed in the passenger cabin than the air conditioning system can provide, the powertrain control module may send a signal to the gasoline engine causing the engine to begin fueling and restart. As long as duct temperature does not pass a predetermined temperature or no more cooling is demanded than the extended engine off climate control system is capable of providing, the operation continues until the powertrain control module senses that the accelerator pedal has been depressed, indicating the end of the extended engine off period. When the accelerator is depressed, the powertrain control module sends a signal to the gasoline engine commanding the engine to begin fueling and restart. As soon as the gasoline engine starts, the powertrain control module sends a signal to the solenoid controlling the two stage orifice causing the orifice to open to the maximum diameter, and another signal to the A/C compressor causing the compressor to begin turning, thereby starting the normal refrigeration cycle. If a reverse flow cooling fan 48 has been employed during the extended engine off period, the powertrain control module also sends a signal causing the fan to stop. The powertrain control module then reverts back to the conventional manner of controlling passenger cabin temperature.

In accordance with a further embodiment of the invention, prior to the gasoline engine stopping in an extended engine off mode, if the powertrain control module senses that the hybrid electric vehicle may be coming to a stop and entering an extended engine off period, for example by monitoring vehicle speed sensor 33 and determining that the vehicle is slowing significantly, the powertrain control module may take steps to operate the extended engine off passenger climate control system in a different manner than the normal operation of the climate control system. Just before the powertrain control module sends a signal to the gasoline engine commanding it to stop, the powertrain control module, depending on whether the temperature control module has indicated the climate control system should be in the heating mode or the cooling mode, sends a signal to either the auxiliary engine coolant pump (if a heating mode has been selected) or to the A/C compressor (if an air conditioning mode has been selected). If the climate control system is in the heating mode, the powertrain control module sends a signal to the auxiliary engine coolant pump, before sending a signal stopping the gasoline engine, causing the auxiliary pump to begin pumping heated engine coolant to the heater core. Pumping heated engine coolant to the heater core before the gasoline engine stops helps to insure that the heater core will retain a sufficient temperature during an extended engine off period to be able to maintain a comfortable heating of the passenger cabin. If the climate control system is in the cooling mode, the powertrain control module sends a signal to compressor 26, before sending a signal stopping the gasoline engine, causing the compressor to cycle on and to build up a larger than normal pressure. Pressure cycling switch 36 limits the maximum pressure on the high pressure side of the air conditioning system. In response to a signal from the pressure cycling switch, powertrain control module 22 normally causes compressor 26 to cycle off when the minimum low side (maximum high side) refrigerant pressure is attained. In accordance with this embodiment of the invention, when the powertrain control module sends the pre-extended engine off signal to compressor 26, the powertrain control module interrupts the normal periodic cycling by preemptively enabling the A/C compressor until the pressure cycling switch again forces the clutch off again. The pre-extended engine off signal from the powertrain control module anticipates the gasoline engine and hence the compressor being off and insures that a high pressure differential exists in the air conditioning system when the extended engine off period begins. In accordance with a further embodiment of the invention, the powertrain control module can also send a signal to the solenoid controlling two stage expansion orifice 28 causing the narrower diameter orifice to be selected prior to the gasoline engine being shut off. Narrowing the orifice of the two stage expansion orifice before the gasoline engine shuts off helps to insure that a high pressure differential exists in the air conditioning system and helps to insure that the climate control system will be able to supply cooling air to the passenger cabin during an extended engine off period. In accordance with a further embodiment of the invention, the powertrain control module can also send a signal to the reverse cooling fan causing it to turn on and draw hot air from the engine bay around the air conditioning condenser. If the climate control system is in the heating mode, when the accelerator pedal is depressed, the powertrain control module sends one signal commanding the gasoline engine to begin fueling and start and another signal commanding the auxiliary engine coolant pump to stop pumping heated engine coolant. If the climate control system is in the cooling mode, when the accelerator pedal is depressed, the powertrain control module sends a signal to the gasoline engine commanding the engine to begin fueling and restart. As soon as the gasoline engine starts, the powertrain control module sends a signal to the solenoid controlling the two stage orifice causing the orifice to open to the maximum diameter, and another signal to the A/C compressor causing the compressor to begin turning, thereby starting the normal refrigeration cycle. In the embodiment of the invention employing a reverse flow cooling fan, the powertrain control module also sends a signal causing the fan to stop turning.

Thus, it is apparent that there has been provided, in accordance with the invention, an extended engine off passenger comfort climate control system and method for its operation that meets the needs set forth above. When conventional hybrid electric vehicles are in an extended engine off situation, they either compromise fuel efficiency to provide passenger comfort (by not shutting off the gasoline engine) or they compromise passenger comfort in favor of fuel efficiency (by shutting off the gasoline engine). The extended engine off passenger climate control system in accordance with the various embodiments of the invention provides heating or cooling to the passenger cabin for short amounts of time when the hybrid electric vehicle's gasoline engine is off, allowing the hybrid electric vehicle to achieve maximum fuel efficiency without sacrificing passenger comfort. Although various embodiments of the invention has been described and illustrated with reference to specific embodiments thereof, it is not intended have been set forth with reference to particular embodiments thereof, it is not intended that the invention be limited to such illustrative embodiments. Those of skill in the art will recognize that many variations and modifications of such embodiments are possible without departing from the spirit of the invention. Accordingly, it is intended to be included within the invention all such variations and modifications as fall within the scope of the appended claims.

The invention claimed is:

1. An extended engine off climate control system for a hybrid electric motor vehicle comprising a gasoline engine in a gasoline engine bay and an electric motor, the system comprising:

an air conditioning compressor;

an air conditioning condenser coupled to receive refrigerant vapor from the air conditioning compressor;

a two stage expansion orifice coupled to receive refrigerant liquid from the air conditioning condenser, the two stage expansion orifice configured to utilize a first orifice size when the gasoline engine is operating and a second orifice size different than the first orifice size when the gasoline engine is not operating;

an air conditioning evaporator coupled to receive refrigerant liquid from the two stage expansion orifice; and a power train control module coupled to control the air conditioning compressor and operational to detect when the gasoline engine is operating and when the gasoline engine is not operating and to send a signal to the two stage expansion orifice to utilize the first orifice size or the second orifice size.

2. The system of claim 1 further comprising a receiver coupled between the air conditioning condenser and the two stage orifice, the receiver comprising a reservoir for refrigerant liquid.

3. The system of claim 1 wherein the air conditioning evaporator comprises an air conditioning accumulator of a larger size than normal for a hybrid electric motor vehicle.

4. The system of claim 1 further comprising a reverse flow cooling fan mounted to blow heated air from the gasoline engine bay across the air conditioning condenser.

5. The system of claim 1, wherein the two stage expansion orifice comprises a solenoid controlled two stage expansion orifice and wherein operation of the solenoid is controlled by the power train control module.

6. The system of claim 1 further comprising:

a heater core; and an auxiliary electric pump configured to circulate heated engine coolant from the gasoline engine through the heater core.

7. The system of claim 6 wherein the auxiliary electric pump is coupled to the power train control module.

8. The system of claim 7 wherein the auxiliary electric pump is activated by the power train control module when the gasoline engine is not running.

9. The system of claim 7 wherein the auxiliary electric pump is activated by the power train control module when the power train control module senses the hybrid electric motor vehicle is about to enter an extended engine off period.

10. The system of claim 1 further comprising:

a plurality of sensors;

a temperature control module configured to receive signals from the plurality of sensors and to transmit a signal to the power train control module in response to the signals received from the plurality of signals.

11. An extended engine off climate control system for a hybrid electric motor vehicle comprising a gasoline engine and an electric motor, the system comprising:

a plurality of sensors;

a temperature control module configured to receive first signals from the plurality of sensors;

a power train control module configured to receive second signals from the temperature control module indicative of a need for cooled air or heated air in response to the first signals received from the plurality of sensors;

an air conditioning system configured to supply cooled air to a passenger cabin of the hybrid electric motor vehicle in response to the second signals, the air conditioning system comprising:

an air conditioning compressor configured to operate in response to a third signal received from the power train control module;

an air conditioning condenser coupled to receive refrigerant vapor from the air conditioning compressor;

a solenoid controlled two stage expansion orifice coupled to receive refrigerant liquid from the air conditioning condenser, the solenoid controlled two stage expansion orifice comprising a first orifice of a first size and a second orifice of a second size different than the first size and configured to select the first orifice or the second orifice in response to receipt by the solenoid of a fourth signal from the power train control module; and a heating system configured to supply heated air to a passenger cabin of the hybrid electric motor vehicle in response to the second signals, the heating system comprising:

a heater core; and an auxiliary electric pump configured to circulate heated engine coolant from the gasoline engine through the heater core in response to a fifth signal received from the power train control module.

12. A method for maintaining passenger climate control in a passenger cabin of a hybrid electric motor vehicle having a gasoline engine and an electric motor, the method comprising the steps of:

sensing a plurality of climate conditions;

sensing vehicle speed; and providing cooled air to the passenger cabin from an air conditioning evaporator in response to sensing the plurality of climate conditions and the vehicle speed by selecting a first orifice size of an expansion orifice positioned between an air conditioning condenser and the air conditioning evaporator when the gasoline engine is operating and selecting a second orifice size of the expansion orifice when the gasoline engine is not operating.

13. The method of claim 12 wherein the step of selecting a first orifice size comprises the step of selecting a first normal orifice size and the step of selecting a second orifice size comprises the step of selecting a second reduced orifice size.

14. The method of claim 12 further comprising the step of circulating heated engine coolant through a heater core during an extended engine off period in response to sensing the plurality of climate conditions and the vehicle speed.

15. The method of claim 12 further comprising the steps of:

sensing change in speed of the hybrid electric motor vehicle;

determining in response to the step of sensing change in speed that the hybrid electric motor vehicle may be stopping;

engaging, prior to the electric motor vehicle stopping, an air conditioning compressor in response to the step of determining; and stopping the gasoline engine after the step of engaging.

16. The method of claim 15 wherein the step of selecting a second orifice size of the expansion orifice comprises the step of selecting a second orifice size prior to the electric motor vehicle stopping.

17. The method of claim 12 wherein the step of selecting the first orifice size comprises the step of selecting the first orifice size when the gasoline engine restarts after an extended engine off period.

18. The method of claim 12 further comprising the step of engaging a reverse flow cooling fan mounted to blow heated air from the gasoline engine across the air conditioning condenser in response to sensing the plurality of climate condition and the vehicle speed.

* * * * *